United States Patent [19]

Meadows

[11] Patent Number: 4,939,672
[45] Date of Patent: Jul. 3, 1990

[54] METHOD AND APPARATUS FOR CLASSIFYING GRAPHICS SEGMENTS TO FACILITATE PICK AND DISPLAY OPERATION

[75] Inventor: Robert D. Meadows, Vancouver, Wash.

[73] Assignee: Tektronix, Inc., Beaverton, Oreg.

[21] Appl. No.: 118,481

[22] Filed: Nov. 9, 1987

[51] Int. Cl.$^5$ .................. H04N 5/14; G06F 15/20
[52] U.S. Cl. ............................ 364/521; 382/44
[58] Field of Search ..................... 364/518–522; 340/721; 382/44–48; 324/121 R

[56] References Cited

U.S. PATENT DOCUMENTS

| | | | |
|---|---|---|---|
| 4,499,597 | 2/1985 | Alves | 382/41 |
| 4,570,181 | 2/1986 | Yamamura | 382/48 |
| 4,752,773 | 6/1988 | Togawa et al. | 340/721 |
| 4,769,636 | 9/1988 | Iwami et al. | 364/522 |
| 4,769,762 | 9/1988 | Tsujido | 364/521 |

Primary Examiner—Gary V. Harkcom
Assistant Examiner—H. R. Herndon
Attorney, Agent, or Firm—John Smith-Hill

[57] ABSTRACT

A display system comprises a data base memory for storing data representing a picture, a display device for displaying the picture, and manipulation means for causing the display device to display a cursor at a position which is under user control. The picture is composed of objects and each object is represented in the data base memory by a segment which represents both the object and the position of the object in the picture. A pointer, which divides the address domain of the display device into at least two regions, is generated. The manipulation means provides a signal which identifies the region of the pictures in which the cursor is positioned, and this signal is compared with the contents of the data base memory to facilitate selection of an object which lies in the identified region of the picture.

14 Claims, 1 Drawing Sheet

METHOD AND APPARATUS FOR CLASSIFYING GRAPHICS SEGMENTS TO FACILITATE PICK AND DISPLAY OPERATION

BACKGROUND OF THE INVENTION

This invention relates to a method and apparatus for classifying graphics segments to facilitate pick and display operation.

A computer-aided design (CAD) system may comprise a data base memory for storing information relating an an article whose design is being developed, e.g. an integrated circuit, a program memory for storing programs that are used in developing the design, a processor which acts on the stored information relating to the article in accordance with the stored programs for modifying the stored information, and a user interface whereby the user is able to control operation of the CAD system. Typically, the user interface comprises an input device for loading information into the data base memory, display apparatus for providing a display of the article represented by the contents of the data base memory, or some portion thereof, and a manipulation device for controlling the manner in which the stored programs act on the contents of the data base memory. The CAD system may also include, or be connected to, a printer or plotter for providing a hard copy of the display provided by the display apparatus.

A CAD system may employ a display system in which a picture to be displayed is composed of objects and data representing the objects is stored in the data base memory in the form of segments. A segment is a logically related collection of picture primitives that are operated upon as a single entity. Each segment comprises a segment header portion which includes a unique identification number, a segment body portion which includes picture primitives, for example a list of vectors specified by their end points in a rectangular Cartesian coordinate system, and a segment end portion. All segments in a picture are normally linked together into a structure called the display list. To locate any segment the display list is traversed until the desired segment is located.

In use of a CAD system, it is frequently necessary to carry out operations on an object. These operations might include altering the object or displaying the object at a enlarged scale so that the user can discern features of the object that cannot be clearly seen when the display represents the entire contents of the data base memory. The operation of selecting, or picking, the data segment that represents an object of interest is performed by displaying a cursor which is movable under user control by use of the manipulation device, which may be a joystick, a mouse or other manipulation device. If the user wishes to select the segment representing a particular object, the cursor is placed over the object on the display and a pick operation is performed. The segment may now be the subject of future operations, e.g. display at an enlarged scale. To locate the segment under the cursor during a pick operation a search is conducted in which each segment of the picture is examined in turn until a segment located under the cursor is found. This search may be accomplished by using the contents of the data base memory to draw a virtual, i.e., undisplayed, image in the address space of the display apparatus and carrying out a logical AND operation between the locations that are pixilated during this drawing operation and the location of the cursor. On average, N/2 segments need to be tested for cursor coverage, where N is the number of segments. Locating the cursor directly over the object of interest can be difficult. Therefore, pick operations can also be performed to find segments located within an area around the cursor. The area in which segments can be found is called a pick aperture. Pick operations are time consuming, and in the case of a large data base may take up to 30 seconds to complete. Such a delay is disturbing to the user of the CAD system. However, it is not practicable to keep a running check on the identity of the segment under the cursor as the cursor is moved through the picture, since this would entail continually updating the cursor segment at a high speed.

In a CAD system employing a segmented display, the display is not created directly from the segments stored in the data base memory, by continuously drawing a succession of vectors on the display screen. Rather, the contents of the data base memory are used to create a virtual image of the vectors in the address domain of a frame buffer and the contents of the frame buffer are used to drive a raster scan display device which displays the contents of the frame buffer. If the address space of the frame buffer is larger than the address domain occupied by the virtual image, the entire contents of the data base memory are represented in the display. If it is desired to display an object at an enlarged scale, the contents of the frame buffer must be changed. With a conventional CAD system having a segmented display, the contents of the data base memory are used to create a virtual image representing the entire contents of the data base memory over an enlarged address domain, with only the object of interest being within the address space of the frame buffer. Again, this is a time-consuming operation and may be disturbing to the user of the CAD system.

It has been observed that in most pictures that are displayed using a CAD system, the density with which information (represented by total vector length) is distributed over the picture area, both in the horizontal, or X, direction and in the vertical, or Y, direction, varies substantially in accordance with a Gaussian function. Therefore, half of the information content of the display is associated with values of X that are less than the value /X associated with the peak of the Gaussian function and half of the information content is associated with values of X that are greater than /X. Furthermore, one quarter of the information content of the display is associated with values of X that are less than $/X - 0.67$ s.d.X (where s.d.X is the standard deviation in the X direction), one quarter with values of X between $/X - 0.67$ s.d.X and /X, one quarter with values of X between /X and $/X + 0.67$ s.d.X, and one quarter with values of X greater than $/X + 0.67$ s.d.X. Similarly, in the Y direction one quarter of the information content of the display is associated with each of the four bands of the display characterized respectively by values of Y less than $/Y - 0.67$ s.d.Y, between $/Y - 0.67$ s.d.Y and /Y, between /Y and $/Y + 0.67$ s.d.Y, and greater than $/Y + 0.67$ s.d.Y.

SUMMARY OF THE INVENTION

A preferred embodiment of the present invention is a display system which comprises a data base memory for storing data representing a picture, a display device for displaying the picture, and manipulation means for causing the display device to display a cursor at a position which is under user control. The picture is composed of objects and each object is represented in the data base memory by a segment which represents both the object and the position of the object in the picture. A pointer, which divides the address domain of the display device into at least two regions, is generated. The manipulation means provide a signal which identifies the region of the picture in which the cursor is positioned, and this signal is compared with the contents of the data base memory to facilitate selection of an object which lies in the identified region of the picture.

BRIEF DESCRIPTION OF THE DRAWINGS

For a better understanding of the invention, and to show how the same may be carried into effect, reference will now be made, by way of example, to the accompanying drawings in which.

DETAILED DESCRIPTION

Figure 1:
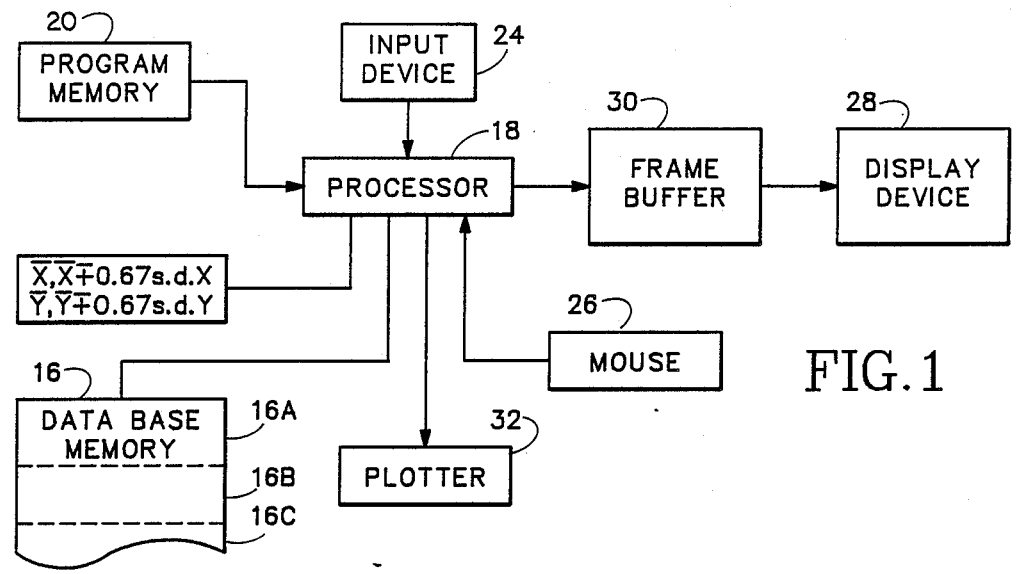
FIG. 1 is a block diagram of a CAD system.
Figure 2:
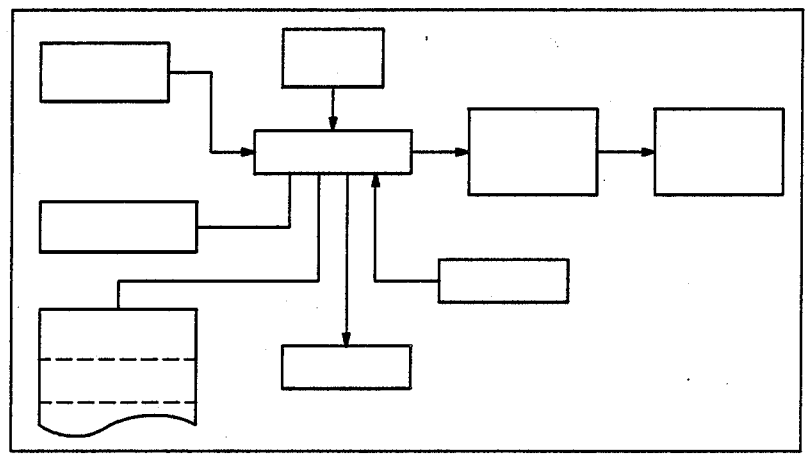
FIG. 2 illustrates a typical display provided by the CAD system.

The CAD system illustrated in FIG. 1 comprises a data base memory 16 containing files 16A, 16B, ..., and a processor 18 for operating on the data contained in the data base files in accordance with programs stored in a program memory 20. The processor operates on the data by transferring data between files and carrying out other operations on data contained in one of the files, which is referred to herein as the display file. A user interface includes an input device 24 for loading data into the data base memory, and a manipulation device 26, such as a mouse, for controlling the nature of the operations performed on the data stored in the data base memory. The user interface also includes display apparatus which comprises a frame buffer 30 and a raster-scan cathode ray tube display device 28 which provides a display based on the contents of the frame buffer 30. The display that is provided on the display device is a bit-mapped representation of the contents of the frame buffer 30. An output device 32, such as a plotter, is connected to the CAD system for providing a hard copy of the display provided by the display device.

The information that is stored in the data base memory is in the form of graphic segments. Each segment has a header portion which includes a unique identification number segment, a body portion which includes a list of vectors, and an end portion. The header portion of each data segment stored in the file 16A includes a segment classification code which represents the location of the object in the picture. The manner in which the segment classification code is derived is explained below.

In accordance with the invention, the address domain of the display apparatus is divided into regions of substantially equal information content. In the event that information content is assumed to be based on vector length, the processor calculates and stores the mean, $/X$, of the picture. If the jth vector of the ith segment in the file 16A is identified by the coordinates of the vector endpoints $(X1_{ij}, Y1_{ij})$ and $(X2_{ij}, Y2_{ij})$, the value of $/X$ is given by $$1/N * \text{Sum}(i,j)(X1_{ij}+X2_{ij})/2$$

where N is the total number of vectors in the picture and Sum(i,j) represents summation over all i and all j.

In addition, the standard deviation s.d.X of the X position is calculated and stored. The value of s.d.X is given by $$(\text{Sum}(i,j)((X1_{ij}+X2_{ij})/2 - /X)2)\tfrac{1}{2}$$

Figure 3:
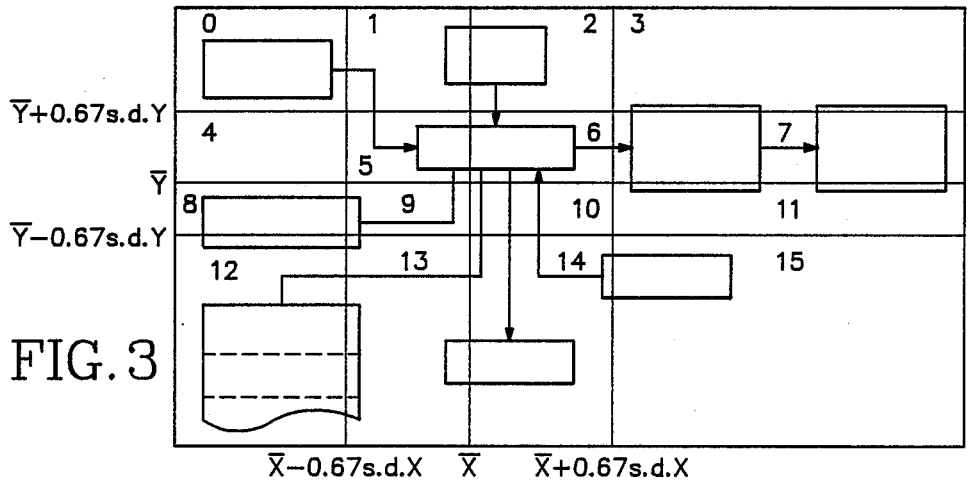
FIG. 3 illustrates the FIG. 2 display with additional information applied thereto.

Techniques for calculating s.d.X without previous knowledge of $/X$ are well known. Similarly, values of $/Y$ and s.d.Y are calculated from the values of $Y1_{ij}$ and $Y2_{ij}$ and are stored for the picture. Assuming the information content of the picture varies substantially in accordance with a Gaussian function, the picture can now be divided into as many regions of equal information content as desired. If, for example, it is desired to divide the address domain into sixteen regions, the processor 18 utilizes the stored values to generate pointers at $/X$, $/X \mp 0.67$ s.d.X, $/Y$, and $/Y \mp 0.67$ s.d.Y. In this manner, 16 regions, each of which contains approximately one-sixteenth of the information stored in file 16A of the data base memory, as represented by the lengths of the vectors, are defined in the address domain of the display apparatus. The locations of these pointers are illustrated in FIG. 3 by vertical and horizontal region divider lines, but these lines would not normally be displayed. In fact, the CAD system shown in FIG. 1 does not have the capability of creating the auxiliary display that would be necessary to show the lines. Each region is identified in the CAD system by a number in the range from 0 to 15. The numbers may be distributed as shown in FIG. 3, although they do not appear in the display. The segment classification code has 16 bits which may be regarded as being numbered from 0 through 15 from left to right. If part of an object appears within the boundary of the kth region, the kth bit of the segment classification code is logical 1, and otherwise it is logical 0. The segment classification code therefore is not restricted to identifying a single region.

In order to pick a segment that is to be operated on, the mouse is manipulated until the cursor is over the object that is represented by the segment. The processor generates a 16 bit cursor classification code. If the cursor is located in the kth region of the display, the kth bit of the cursor classification code is logical 1 and all other bits are logical 0. A logical AND operation is performed on a bit by bit basis using the cursor classification code and the segment classification code. Segments for which the AND operation does not yield a logical 1 for the kth bit are transferred to file 16B and are not examined further. File 16A then contains only the segments for which the logical AND operation yielded a logical 1 for the kth bit. The processor examines each of the segments remaining in file 16A in order to identify the one that is under the cursor. This examination is conducted in conventional fashion. On finding the segment that is under the cursor, the desired pick operation has been completed. However, this has been done without its having been potentially necessary to examine all the segments. On average, and assuming that each segment covers only one region of the picture, only N/32 segments need to be tested for cursor coverage, which represents a reduction by a factor of 16. in general, if the picture is divided into M regions of equal information content, the time required to locate the segment under the cursor is reduced by a factor of M. In almost all practical pictures some segments will cover more than one region, but most segments will cover only one region. To calculate the number of segments that must be tested when segments cover more than one region, let C(i) be the number of segments that cover i regions. The average number of searches required to perform a pick operation is Sum(C(i)*i)/2M. This reduces to N/2M when all segments cover only one region. Furthermore, pick operations can be performed with an aperture by searching each region the pick aperture covers. In most CAD applications the number of searches required to locate a segment during a pick operation will closely approximate N/2M for a reasonably small number of regions such as 16 and a normal sized pick aperture.

When the segment representing the object of interest has been picked, the user may cause the object represented by that segment to be displayed. This may be facilitated by transferring all the other segments from file 16A of the data base memory to another file, e.g. file 16B. The contents of file 16A are thereby further reduced, and accordingly it takes much less time to process the contents of the file 16A and load the frame buffer.

When the contents of file 16A changes, the values of /X, /Y and s.d.X and s.d.Y are recalculated, based on the new contents of file 16A, and if the new value of any of these variables differs by more than 10% from its previous value, the new values are used to generate the pointers.

In certain circumstances, the user may wish to examine a portion of the entire picture, rather than a single object, at an enlarged scale. Thus, the user may wish to examine an object of interest against a background of other objects in the immediate vicinity of the object of interest. In this case, the cursor is positioned over the object of interest and the processor determines which region contains the object of interest. The user may then instruct the processor to display all objects that lie in that region, and possibly also the objects that lie in one or more adjacent regions. The segments representing the selected objects are retained in file 16A and the remaining segments are transferred to file 16B. The processor draws a virtual image of the vectors represented by the segments in file 16A in the address space of the frame buffer, and that portion of the virtual image which lies in the address domain of the display apparatus is loaded into the frame buffer and is used to drive the display device. An enlarged display of the selected objects is thereby provided. If the detail of the enlarged display is insufficient, the user can repeat the pick operation by reference to the new pointers and select one or more regions of the enlarged display for display at a still larger scale. If the operator then wishes to select a single object for display or modification, this can be accomplished using the procedure that was previously described.

Either file of the data base memory may be selected for loading the frame buffer. If, for example, the user initially selected region 5 and caused regions 0-4 and 6-16 to be transferred to file 16B, and then determined that he had made a mistake and that the object of interest was not in fact in region 5, the user may then select file 16B as the display file. New values for the pointers are computed based on the contents of file 16B, i.e., the original contents of file 16A but without region 5, and the values will normally be different from the values calculated on the basis of the contents of file 16A.

Determining which regions of the picture contain a given segment is generally quite easy, because most segments contain only the poly-line primitive. In this case, if all the vector end points are in the same region, the segment covers only that region, and the segment classification code contains only one logical 1, at the position corresponding to the number of the region. In general, the segment classification code for a segment is created by comparing the values of X and Y in the vector list for the segment with the values of /X, /X∓0.67 s.d.X, /Y and /Y∓0.67 s.d.Y, and thereby determining the regions that contain the end points of the vectors.

For some graphic primitives it may be non-trivial to determine which regions the segment in fact covers. As an example, assume that a picture is broken into 16 regions as is FIG. 3. If a line segment has end points in regions 0 and 5 then the line must also be located in either region 1 or 4. Algorithms could be developed to determine which of the regions 1 and 4 the line is located in. For example, intersecting the line segment with the boundary between segment 0 and segment 1 will determine if region 1 or 4 is covered: when the intersection exists region 1 is covered else region 4 is covered. Performing such a line segment intersection yields the actual segment classification code but may require too much time. A simpler procedure is to mark the segment containing the line segment as covering the superset {0,1,4,5} rather than calculating which set {0,1,5} or {0,4,5} is the actual segment classification set. Calculating a superset for the actual coverage set of a segment degrades the speed of future operations such as picks but reduces the computation complexity of determining which regions a segment actually covers. The speed of subsequent operations will be reduced by a factor of one plus the ratio of the number of extra regions marked as covered compared to the actual number of regions covered. For configurations which seldom occur, and assuming a picture is being dynamically modified, marking supersets of actual coverage sets for segments reduces the overall time required by the user to manipulate the picture.

It will be appreciated that the present invention is not restricted to the particular embodiment that has been described and illustrated, and that variations may be made therein without departing from the scope of the invention as defined in the appended claims and equivalents thereof. For example, it is not necessary that the segments that are used to calculate the values of the pointers represent objects that are distributed over the entire screen, since they may be contained in a window against a background that is not divided. There may be multiple windows against a given background, and each may contain a display of objects represented by a set of segments, with the values of the pointers for each set being calculated separately. The picture might not be composed only of vectors, and may include tiled areas. If the mth tiled areas is of area $A_m$ and has a centroid at $(X_m, Y_m)$, the value of /X is given by $$A\,\text{Sum}(i,j)(X1_{ig}+X2_{ij})/2 + B\,\text{Sum}(m)(A_m X_m)$$

where A and B are weighting factors, and the value of s.d.X is given by $$C(\text{Sum}(i,j)((X1_{ig}+X2_{ij})/2 - /X)^{}2)^{}\tfrac{1}{2} + D\cdot(\text{Sum}(m)(A_m X_m - /X)^{}2)^{}\tfrac{1}{2}$$

where C and D are weighting factors. The values of /Y and s.d.Y are calculated in similar fashion. The values of the weighting factors depend on the relative times taken to draw a typical vector and tile a typical solid area. If the pick operation is performed by a method that does not involve drawing a virtual image of the contents of the display file, it may not be appropriate to use the length of the vectors, which determines the time taken to draw the vectors, as a measure of information content.

It should be noted that the use of four subdivisions for the picture in each direction is arbitrary, and that the number of subdivisions can be selected as desired. The method to set the locations of subdivision points in each direction is standard knowledge in Statics for Gaussian distributions.

I claim:

1. A display system comprising:
    (a) a data base memory for storing data representing graphic objects, each object being represented in the data base memory by a segment which represents the object and the position of the object in a coordinate space,
    (b) a display device for displaying a picture composed of the graphic objects represented by the data stored in the display memory, the display device having an address domain that lies within said coordinate space,
    (c) user interface means for providing a signal for identifying a position within the address domain of the display device, and
    (d) processor means programmed to (1) analyze statistical properties of the data and generate, on the basis of said statistical properties, an address word that identifies a position along a first axis of the coordinate space at a position within the address domain of the display device, whereby the address domain is divided into two regions, (2) identify the region of the address domain in which the position identified by the user interface means lies, and (3) distinguish segments representing objects that lie at least partially inside the identified region of the address domain from other segments.

2. A display system according to claim 1, wherein the display device has a display domain that corresponds to said address domain and the user interface means comprise means for causing the display device to display a cursor within the display domain at a position which is under user control and the signal generated by the user interface means represents the corresponding position in said address domain, and the processor means are programmed to examine each segment representing an object that lies at least partially inside the identified region of the address domain to determine whether its position is substantially the same as the position represented by the signal generated by the user interface means.

3. A display system according to claim 1, wherein each segment contains a list of vectors identified by their end points in a rectangular Cartesian coordinate system.

4. A display system according to claim 3, wherein the address word generated by said processor means is derived by calculating the sum over all vectors of the position of the vector along said first axis, weighted in accordance with the component of the length of the vector along said first axis.

5. A display system according to claim 4, wherein said processor means are programmed to generate at least one additional address word that identifies a position that is spaced apart along said first axis from the position represented by the first-mentioned address word, said additional address word being derived by calculating the standard deviation over all vectors of the position of the vector along said first axis, weighted in accordance with the component of the length of the vector along said first axis.

6. A display system according to claim 1, wherein said processor means are programmed to generate, on the basis of said statistical properties, a second address word which identifies a position along a second axis of the coordinate space within the address domain of the display device, whereby the address domain is divided into four regions.

7. A method of operating on segments that are stored in a first file of a data base memory and represent objects in N-dimensional space, where N is greater than one, so as to facilitate identification of segments that might represent an object of interest, comprising:
    (a) subdividing the ith axis of the N-dimensional space into di portions, whereby the N-dimensional space is divided into Prod.(i)(di) regions, where Prod.(i) represents the product over all i,
    (b) associating a coverage set with each segment, the coverage set identifying the regions that contain the object represented by the segment,
    (c) generating a selection set which identifies the region that contains the object of interest,
    (d) comparing the coverage set with the selection set,
    (e) selecting each segment for which the regions identified by the coverage set do not include the region identified by the selection set, and
    (f) transferring the selected segments from the first file of the data base memory to a second file thereof.

8. A method according to claim 7, wherein step (a) comprises:
    assigning a weighting factor to each object,
    calculating a weighted mean $/Xi$ for the locations of the objects along the ith axis,
    calculating a weighted standard deviation $s.d.Xi$ for the locations of the objects along the ith axis, and
    subdividing the ith axis into four portions corresponding respectively to values of Xi such that $Xi </Xi - 0.67 \ s.d.Xi$, $/Xi - 0.67 \ s.d.Xi <= Xi </Xi$, $/Xi <= Xi </Xi + 0.67 \ s.d.Xi$, and $/Xi + 0.67 \ s.d.Xi <= Xi$.

9. A method according to claim 7, wherein step (a) comprises analyzing statistical properties of the contents of the first file of the data base memory and subdividing the ith axis of the N-dimensional space into di portions on the basis of the statistical properties.

10. A method of operating a display system comprising a data base memory for storing data representing graphic objects, each object being represented in the data base memory by a segment which represents the object and the position of the object in a coordinate space, a display device for displaying a picture composed of the graphic objects represented by the data stored in the display device, the display device having an address domain that lies within the coordinate space, and user interface means for providing a signal for identifying a position within the address domain of the display device, the method comprising:
    (a) analyzing statistical properties of the data and generating, on the basis of the statistical properties, an address word that identifies a position along a first axis of the coordinate space at a position within the address domain of the display device, whereby the address domain is divided into two regions,
- (b) determining the region of the address domain in which the position identified by the user interface means lies, and
- (c) distinguishing segments representing objects that lie at least partially inside the identified region of the address domain from other segments.

11. A method according to claim 10, wherein step (c) comprises modifying the picture displayed by the display device so that the objects that lie at least partially inside the identified region are displayed and other objects are not displayed.

12. A method according to claim 10, wherein each segment contains a list of vectors identified by their end points in a rectangular Cartesian coordinate system, and the position represented by the address word generated in step (a) is the mean over all vectors of the position of the vector along said first axis.

13. A method according to claim 12, further comprising:
- (d) calculating the standard deviation over all vectors of the position of the vector along said first axis, weighted in accordance with the component of the length of the vector along said first axis, and generating at least one additional address word that identifies a position that is spaced apart along said first axis from the position identified by the first-mentioned word by an amount that depends on said standard deviation, whereby the address domain is divided into at least three regions.

14. A method according to claim 10, further comprising generating, on the basis of said statistical properties, a second address word which identifies a position along a second axis of the coordinates space within the address domain of the display device, whereby the address domain is divided into four regions.

* * * * *